(12) United States Patent
Swank et al.

(10) Patent No.: US 7,487,716 B2
(45) Date of Patent: Feb. 10, 2009

(54) ROTISSERIE OVEN

(75) Inventors: Phillip D. Swank, Germantown, WI (US); C. Philip Insisiengmay, Waukesha, WI (US); David Farchione, Jackson, WI (US); Michael Lemke, Oak Creek, WI (US); B. Erich Rehm, West Bend, WI (US); Bill Hansen, Pewaukee, WI (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 824 days.

(21) Appl. No.: 10/911,304

(22) Filed: Aug. 4, 2004

(65) Prior Publication Data

US 2005/0022676 A1    Feb. 3, 2005

Related U.S. Application Data

(63) Continuation-in-part of application No. 10/428,796, filed on May 2, 2003, now abandoned, which is a continuation-in-part of application No. 10/078,845, filed on Feb. 19, 2002, now Pat. No. 6,608,288.

(51) Int. Cl.
*A47J 37/04* (2006.01)
*A21B 1/22* (2006.01)

(52) U.S. Cl. ............... 99/421 P; 99/421 H; 99/476; 99/479; 219/395; 219/400; 219/411

(58) Field of Classification Search ............... 99/421 H, 99/421 P, 474, 476, 477, 479; 219/400, 401, 219/393, 395, 411; 126/21 A, 25 A
See application file for complete search history.

(56) References Cited

U.S. PATENT DOCUMENTS

| | | | |
|---|---|---|---|
| 3,379,119 A | 4/1968 | Harrill | |
| 3,604,895 A | 9/1971 | MacKay | |
| 4,030,476 A | 6/1977 | Hock | |
| 4,233,892 A | 11/1980 | Hawkins | |
| 4,535,750 A | 8/1985 | Hebert et al. | |
| 4,730,100 A | 3/1988 | Pingelton | |
| 4,736,638 A | 4/1988 | Okawa et al. | |
| 4,851,644 A | 7/1989 | Oslin | |
| 4,968,515 A | 11/1990 | Burkett et al. | |
| 5,044,262 A | 9/1991 | Burkett et al. | |
| 5,203,255 A | 4/1993 | Wells et al. | |
| 5,361,686 A | 11/1994 | Koopman | |
| 5,429,042 A | 7/1995 | Koopman | |

(Continued)

FOREIGN PATENT DOCUMENTS

DE    3401002 A1    7/1985

(Continued)

*Primary Examiner*—Reginald L Alexander
(74) *Attorney, Agent, or Firm*—Quarles & Brady LLP

(57) ABSTRACT

A rotisserie oven is provided having a radiating heating system in combination with a convection heating system to prepare raw meat and poultry food product inside of a cooking chamber. A spit assembly carries the food product, and includes components that are detachable to assist in cleaning. The oven further includes a steam cleaning assembly that is integrated with the convection heating system that assists in grease removal from the components inside the cooking chamber. A humidity removal system regulates the moisture level inside of the cooking chamber during food preparation.

21 Claims, 12 Drawing Sheets

U.S. PATENT DOCUMENTS

| | | | |
|---|---|---|---|
| 5,451,744 A * | 9/1995 | Koopman et al. | 219/400 |
| 5,465,653 A * | 11/1995 | Riccio | 99/421 H |
| 5,485,780 A | 1/1996 | Koether et al. | |
| 5,520,095 A | 5/1996 | Huber et al. | |
| 5,619,983 A * | 4/1997 | Smith | 126/348 |
| 5,639,497 A | 6/1997 | Bedford et al. | |
| 5,640,946 A | 6/1997 | Oslin | |
| 5,688,422 A | 11/1997 | Landwehr et al. | |
| 5,767,487 A * | 6/1998 | Tippmann | 219/440 |
| 5,768,982 A * | 6/1998 | Violi et al. | 99/476 |
| 5,845,563 A | 12/1998 | Haring et al. | |
| 6,138,553 A * | 10/2000 | Toebben | 99/421 H |
| 6,153,858 A | 11/2000 | Barnes et al. | |
| 6,240,838 B1 | 6/2001 | Backus et al. | |
| 6,272,975 B1 | 8/2001 | Usherovich | |
| 6,330,853 B1 | 12/2001 | Yu | |
| 6,363,836 B1 | 4/2002 | Usherovich | |
| 6,369,362 B1 | 4/2002 | Brenn | |
| 6,393,972 B1 | 5/2002 | Backus et al. | |
| 6,410,890 B1 * | 6/2002 | Kohlstrung | 219/401 |
| 6,450,087 B2 | 9/2002 | Backus et al. | |
| 6,484,625 B2 | 11/2002 | Waltman | |
| 6,509,549 B1 | 1/2003 | Chasen et al. | |
| 7,241,977 B2 * | 7/2007 | Friedl et al. | 219/411 |
| 2002/0088350 A1 | 7/2002 | Backus et al. | |
| 2002/0108500 A1 | 8/2002 | Backus et al. | |

FOREIGN PATENT DOCUMENTS

| | | |
|---|---|---|
| EP | 0379755 | 8/1990 |
| EP | 0801271 | 10/1997 |
| EP | 0 872 203 A1 | 10/1998 |
| EP | 1557612 A1 | 7/2005 |
| GB | 451702 | 8/1936 |

* cited by examiner

ROTISSERIE OVEN

CROSS-REFERENCE TO RELATED APPLICATIONS

This is a continuation-in-part of U.S. patent application Ser. No. 10/428,796 filed May 2, 2003, now abandoned which is a continuation-in-part of U.S. patent application Ser. No. 10/078,845, filed Feb. 19, 2002, now issued as U.S. Pat. No. 6,608,288, the disclosures of each of which are hereby incorporated by reference as if set forth in their entirety herein.

BACKGROUND OF THE INVENTION

The present invention relates generally to cooking implements, and in particular relates to rotisserie ovens.

Rotisserie ovens are traditionally used to cook raw meat and poultry product, such as chicken, duck, and the like inside a cooking chamber. In particular, a food product to be prepared is carried by a rotating spit assembly that brings the food product into communication with a radiating heat source that cooks, and in some cases browns, the outer surface of the food product.

Unfortunately, conventional rotisserie ovens suffer from several drawbacks. For instance, if the door to the cooking chamber is not sufficiently sealed, flavorful gasses may escape from the oven. Furthermore, conventional ovens allow condensation to accumulate on the interior surface of the glass door, thereby inhibiting a user's ability to visually inspect the food without opening the door. Additionally, conventional spit assemblies are difficult to disassemble for cleaning purposes. Moreover, conventional ovens do not provide a user-friendly method for removing grease produced during cooking, and additionally fail to provide a user-friendly method and apparatus for cleaning the cooking chamber upon completion of a food preparation sequence.

It has thus become desirable to provide a rotisserie oven that overcomes these deficiencies, and that further improves upon existing rotisserie ovens.

BRIEF SUMMARY OF THE INVENTION

In accordance with one aspect of the invention, a rotisserie oven is provided for preparing cooked food product from a raw food product. The oven includes a cooking chamber defined by side walls joined at their outer ends to upper and lower walls. The cooking chamber defines at least one open end that is closed by a movable door assembly. A radiating heating system is disposed in the cooking chamber that receives an electrical current and produces radiating heat. A convection heat system is also disposed in the cooking chamber, and includes A) one ore more heating elements that produce heat in response to an electrical current, and B) a rotating fan that draws incoming air from the cooking chamber into the convection heat system, forces the air over the heating elements to become heated, and expels the heated air into the cooking chamber. The oven further includes a spit assembly including a pair of rotating discs rotatably attached proximal the side walls and carrying at least one spit configured to support a food product that is heated by the radiating heat source and the convection heat source.

The foregoing and other aspects of the invention will appear from the following description. In the description, reference is made to the accompanying drawings which form a part hereof, and in which there is shown by way of illustration, and not limitation, a preferred embodiment of the invention. Such embodiment does not necessarily represent the full scope of the invention, however, and reference must therefore be made to the claims herein for interpreting the scope of the invention.

DETAILED DESCRIPTION OF THE PREFERRED EMBODIMENT

Figure 1:
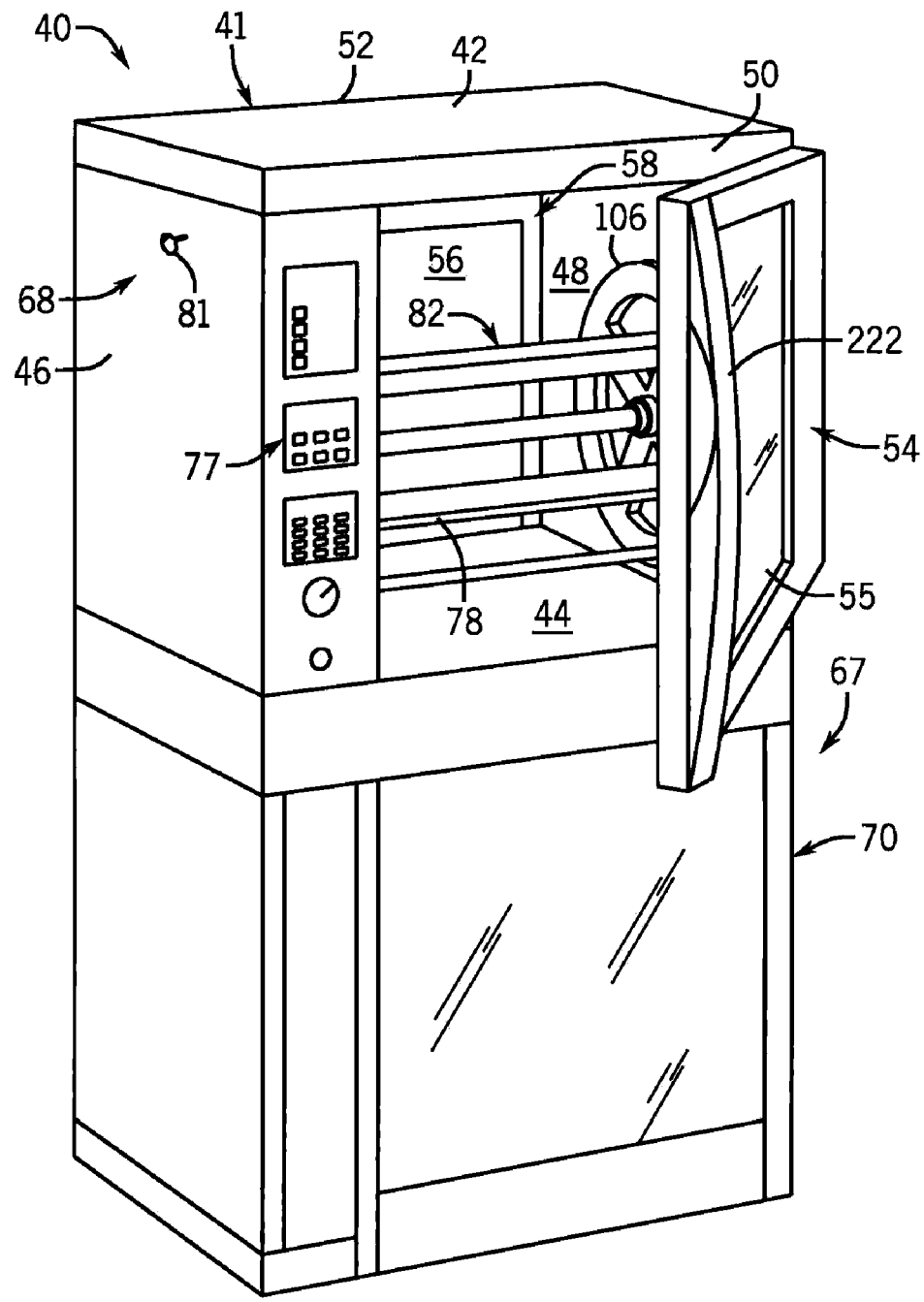
FIG. 1 is a perspective view of a rotisserie oven stacked on top of a warming chamber in accordance with the preferred embodiment.

Referring initially to FIG. 1, a rotisserie oven 40 includes an outer housing 41 having upper and lower walls 42 and 44, respectively, opposing left and right side walls 46 and 48, respectively, and opposing front and rear walls 50 and 52 (shown in FIG. 2), respectively. A cooking chamber 58 is defined by upper and lower walls 42 and 44, right side wall 48, and a left chamber side wall 64 (See FIG. 14) spaced inwardly from, and extending parallel to, oven side wall 46.

Walls 64 and 46 thus define the lateral boundaries of a cabinet 68 that contains control components (e.g., a microprocessor, not shown, or other suitable controller) of oven 40. In particular, cabinet 68 houses a control assembly (not shown) that controls various aspects of the oven 40, such as temperature control, cooking sequences, and cleaning functions as is described in more detail below. Cabinet 68 further houses a motor 74 (See FIG. 2) that drives a spit assembly 82. Oven operation is controlled by an operator via a set of user controls and outputs 77 that are disposed on the front wall 50 of cabinet 68. An indicator 81, such as a light or an audible alarm, can be disposed anywhere on the oven, including at the chef side or the server side, and can be activated either manually or automatically via controls 77 upon completion of a cooking sequence.

A front door assembly 54 is connected to the front wall 50, and a rear door assembly 56 is carried by the rear wall 52 that can both be opened and closed to provide access to cooking chamber 58. Front door assembly 54 includes a window assembly 55 that provides visible access to the cooking chamber 58, as will be described in more detail below. Rear door assembly 56 is preferably constructed in the manner described with respect to front door assembly 54. Oven 40 thus has a pass-through design as described in U.S. Pat. No. 6,608,288, and thus may further be used in accordance with the methods described therein.

For instance, one such method of using an oven of the type having a heating cavity that utilizes cooking elements to produce a prepared food product from a raw food product, a chef-side access assembly including a first door for the insertion of raw food product into the cavity, and a server-side access assembly located remote from the chef-side access assembly and including a second door for the removal of prepared food product from the cavity, can include the step of first inserting raw food product into the cavity via the first door. Next, the cooking elements (preferably the rotisserie cooking elements, as are described in more detail below) are activated via controls 77. Next, indicator 81 is activated once the raw food product has been prepared. Finally, in response to indicator 81, the prepared food product can be removed from cooking chamber via the rear, server-side, door 56.

The rotisserie oven 40 can be mounted on top of a warming chamber 67 including a housing 70 of generally the same size and shape as housing 41, and an internal warming chamber (not shown) of generally the same size and shape of cooking chamber 58. Advantageously, the rotisserie oven 40 and warming chamber 67 may be stacked on top of each other. Ovens 40 and 72 are modular, such that oven 40 has rotisserie and/or convection heating components installed and warming chamber 72 may have a conductive heating systems installed that are configured to maintain the temperature of the food product that was prepared in the rotisserie oven. Oven 40 can alternatively be supported on, for instance, a kitchen floor directly via any suitable conventional a support assembly.

Spit assembly 82 includes a plurality of spits (collectively identified as 78) that span between side walls 46 and 48 of the cooking chamber 58. Specifically, spits 78 span between a pair of support discs 106 (one shown in FIG. 1) and are suitable for retaining meat product such as chicken, turkey, duck, and the like. Discs 106 are rotated under power supplied by motor 74 to correspondingly rotate the meat product with respect to a heat source.

Figure 2:
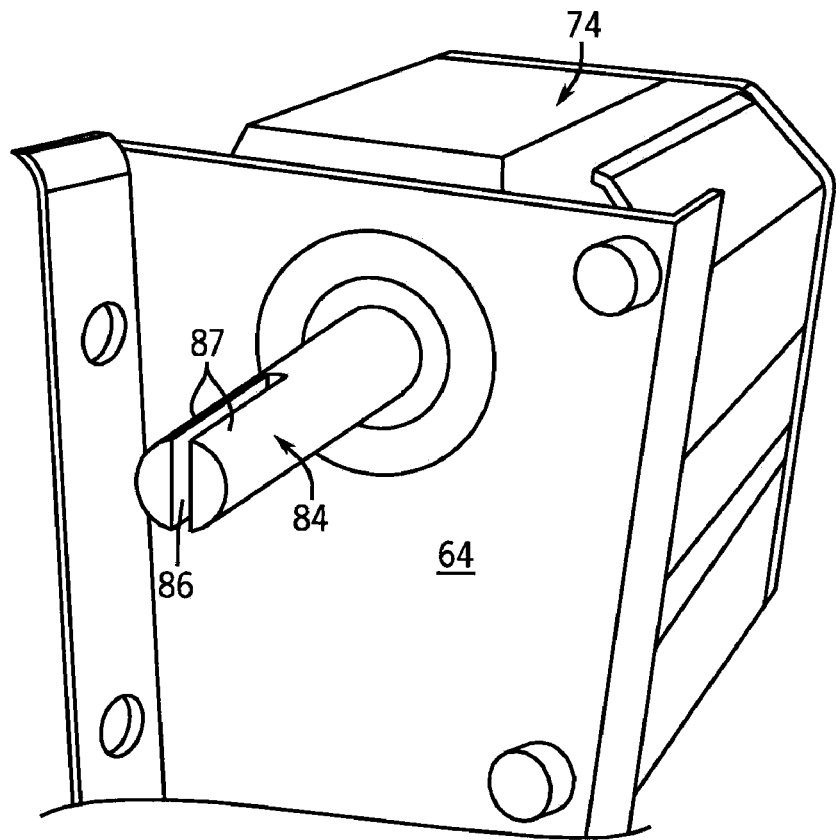
FIG. 2 is a perspective view of a motor that drives the spit assembly illustrated in FIG. 1.

Referring now to FIG. 2, motor 74 is mounted within cabinet, and includes an outwardly extending rotating output shaft 84. Shaft 84 extends through left side wall 64 of the cooking chamber 58. A groove 86 extends axially into the outer end of shaft 84, bifurcating the shaft to define a pair of engaging members 87. Motor 74 operates under electric power to rotate output shaft 86, including members 87. The speed of motor rotation can be set by the user via controls 77.

Figure 3:
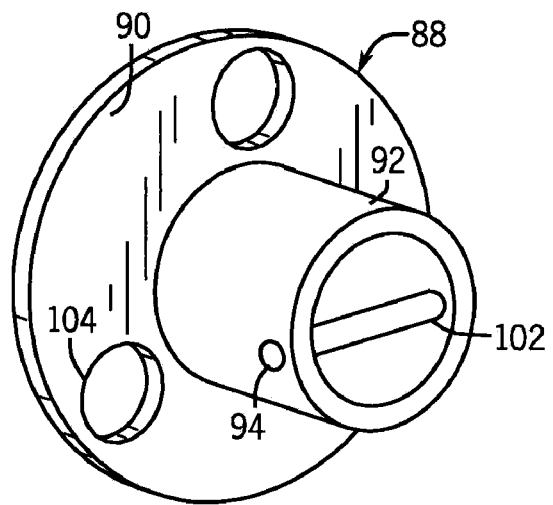
FIG. 3 is a perspective view of a coupling that engages the motor illustrated in FIG. 2.

Referring to FIG. 3, a coupling 88 is provided for attachment to output shaft 84. Coupling 88 includes a cylindrical mounting plate 90 that includes a plurality (preferably three spaced 120° apart) apertures 104 extending axially therethrough. An annular shaft 92 extends outwardly from mounting plate 90 for connection to motor 74. A pair of aligned apertures 94 is formed through the outer end 96 of shaft 92. A dowel 102 having a thickness less than that of groove 86 is inserted into apertures 94. The inner diameter of shaft 92 is slightly greater than the outer diameter of output shaft 84 such that the output shaft 84 is received by shaft 92. When properly inserted, dowel 102 is inserted into groove 86 to interlock the coupling 88 with the output shaft 84. Accordingly, coupling 88 rotates along with output shaft 84 during operation. If desired, a second pair of apertures (not shown) could extend through shaft 92 spaced from apertures 94 that receive a second dowel to further engage members 87 of output shaft 84.

Figure 4:
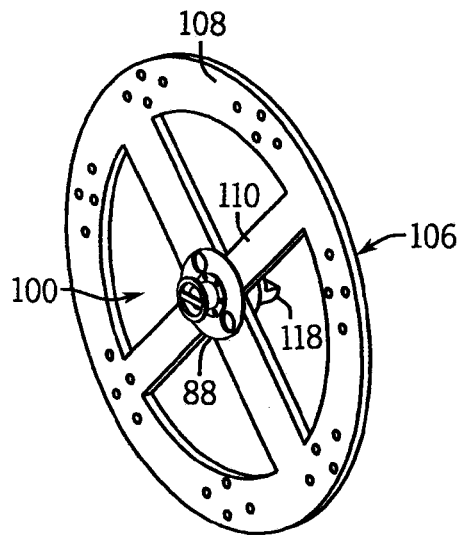
FIG. 4 is a perspective view of an inner surface of a support disc that is connected to the coupling illustrated in FIG. 3.
Figure 5:
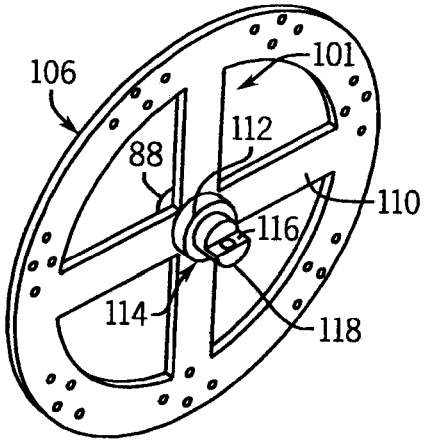
FIG. 5 is a perspective view of the outer surface of the support disc illustrated in FIG. 4.

Referring now to FIGS. 4 and 5, each support disc 106 includes an annular outer ring portion 108 and a pair of perpendicular ribs 110 that are connected at their outer ends to ring portion 108. Ribs 110 intersect at a centrally disposed hub 112, which is centrally disposed relative to disc 106. A pair of discs 106 are provided in accordance with the preferred embodiment, one of which being disposed at the drive end of the spit assembly 82, the other of which being disposed at the driven end of assembly 82.

Figure 7:
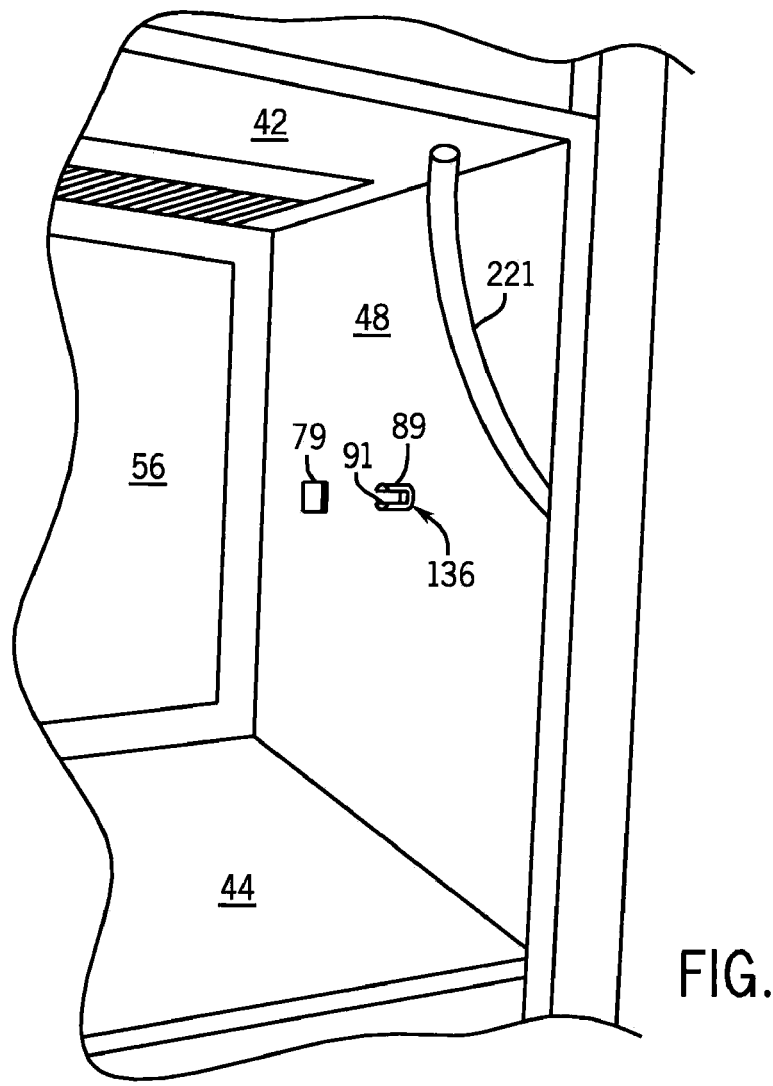
FIG. 7 is a perspective view of a portion of the cooking chamber illustrating a bearing that engages the power transfer shaft illustrated in FIG. 6.

FIG. 4 illustrates an inner, coupling-engaging, face 100 of disc 106. In particular, coupling 88 is attached to surface 100 of hub 112 via screws, projections extending from hub 112, or the like, that extend through apertures 104. Accordingly, once coupling 88 is attached to disc 106, dowel 102 faces outwardly and can engage motor 74 in the manner described above. Referring also to FIG. 7, a roller bearing 136 extends into the cooking chamber 58 from right side wall 48 in linear alignment with output shaft 84. Bearing 136 includes a shaft 89 defining a groove 91 in the manner with respect to output shaft 84. Accordingly, the second disc 106 is rotatably supported within chamber 58 via an attachment with bearing 136 in the manner described above with respect to coupling 88.

FIG. 7 further illustrates a temperature sensor 79 that is mounted onto the right side wall 48 for sensing the temperature in cooking chamber 58. The temperature can displayed at the user outputs 77. An electrical lead 221 is connected to the oven control system, extends into cooking chamber 58 from upper wall 42, and is connected at its outer end to a temperature probe (FIG. 12) as will be described in more detail below.

Referring now to FIG. 5 the outer, shaft-engaging, face 101 of each disc 106 is disposed opposite inner surface 100. A generally cylindrical connector member 114 extends outwardly from outer face 101 at hub 112. The outer end 118 of connector 114 is semi-cylindrical defines a flat engagement surface 116. An opening 117 extends into surface 116 in a direction perpendicular to surface 116.

Figure 6A:
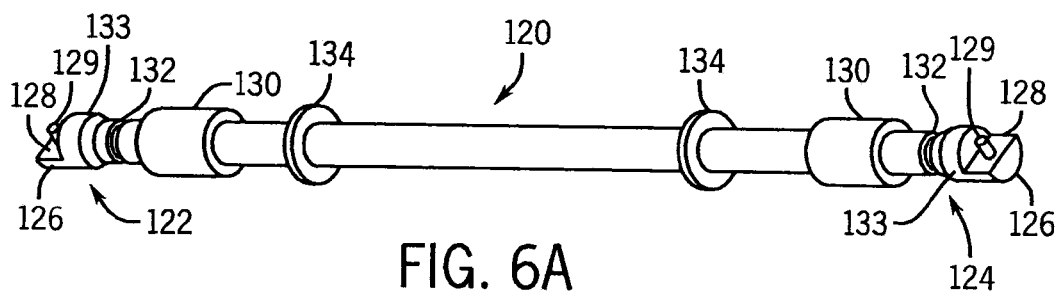
FIG. 6A is a perspective view of a power transfer shaft having a driven end that engages the disc illustrated in FIGS. 4 and 5.
Figure 6B:
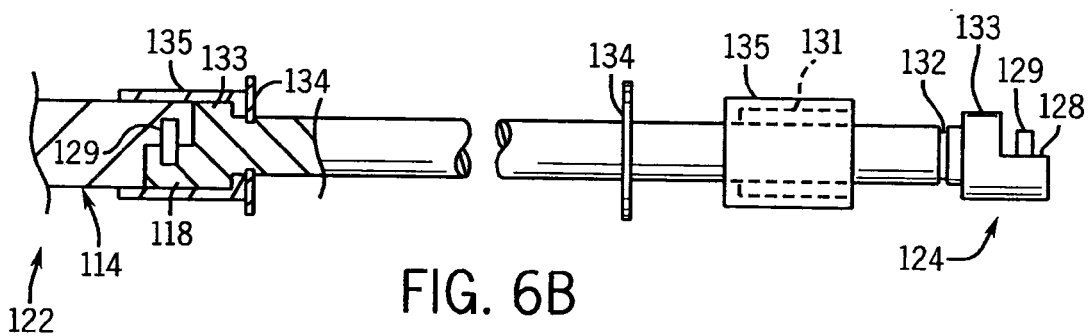
FIG. 6B is a sectional side elevation view of the power transfer shaft illustrated in FIG. 6A having one connected end and a second disconnected end.

Referring now to FIGS. 6A and 6B, a power transfer shaft 120 is provided that is connected between discs 106. Shaft includes a first end 122 disposed proximal the motor, and a second end 124 opposite the first end 122 that is disposed proximal the right side wall 48 of cooking chamber 58. As illustrated in FIG. 6B, end 122 is illustrated as being connected while end 124 is illustrated as being disconnected to demonstrate operation of the components of shaft 120.

Each end 122 and 124 includes a semi-cylindrical connector 126 presenting a flange 133 defining a diameter greater than the diameter of shaft 120. Connector 126 further presents a flat engagement surface 128 downstream from flange 133. A pin 129 extends perpendicularly out from engagement surface 128 sized slightly less than the diameter of opening 117 formed in surface 116 of support disc 106. Engagement surface 128 is thus configured to mate with engagement surface 116 of support disc 106 as pin 129 is inserted into opening 117, thereby causing discs 106 to interlock with shaft 120 with respect to rotation.

A movable collar 135 is provided having an inner diameter sized to correspond to the diameter of shaft 120, and a counterbore 131 sized to correspond to the outer surface of the cylindrical joint formed between connector members 126 and 114. A washer 134 is provided at each end 122 and 124, and is disposed inwardly with respect to collar 135. During operation, once connector 126 is fastened to coupling 114, collar is slid over the resulting cylindrical joint to secure the connector 126 to the coupling 114. Flange 133 provides a stop for collar 135, thus ensuring that collar is properly positioned. When collar is fully engaged, a recess 132 circumferentially formed in shaft 120 is exposed. Washer 134 is slid into engagement with recess 132 to prevent connector 126 from sliding out of engagement with the joint during operation.

Figure 9:
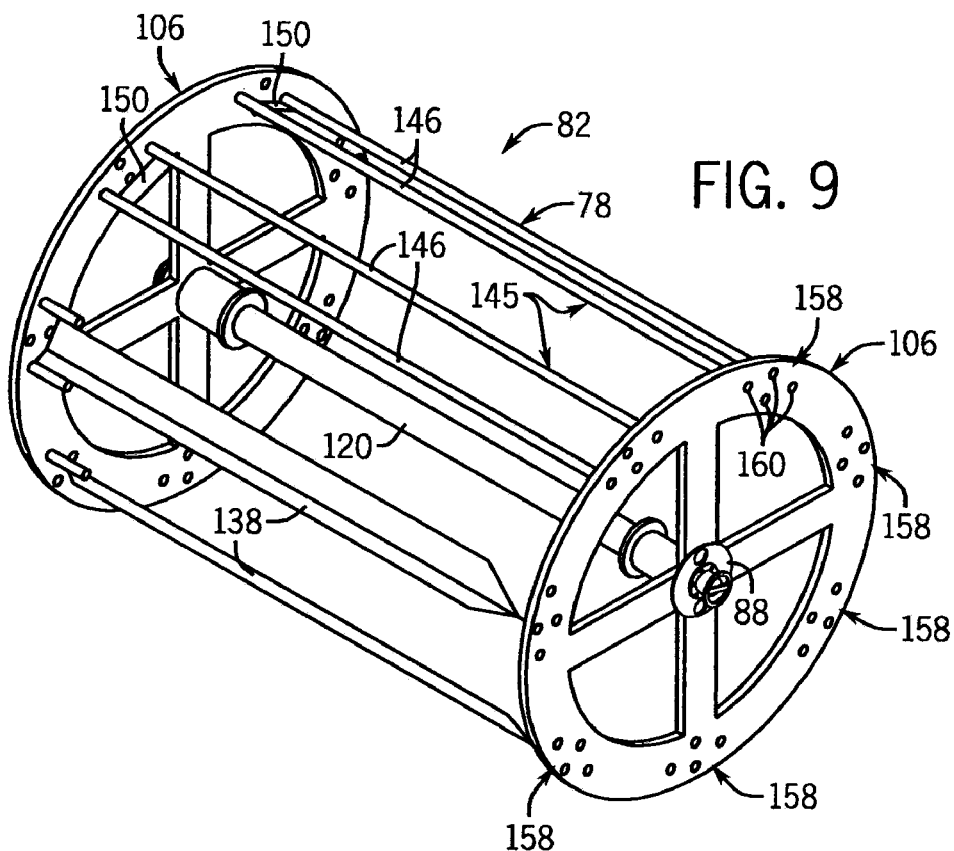
FIG. 9 is a perspective view of an assembled spit assembly having a plurality of angled spits and dual pronged spits mounted in accordance with a preferred embodiment of the invention.
Figure 10:
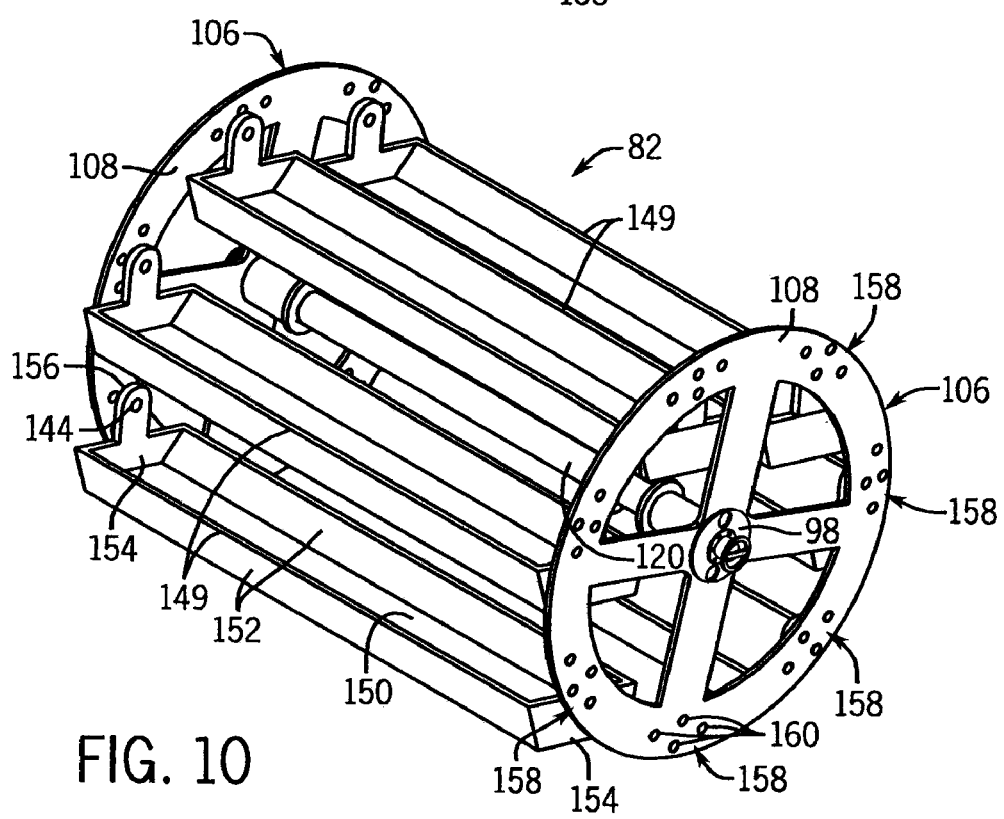
FIG. 10 is a perspective view of the assembled spit assembly illustrated in FIG. 9 having a plurality of baskets mounted in accordance with a preferred embodiment of the invention.

Referring also to FIGS. 9 and 10 in particular, spit assembly 82 is assembled by mounting couplings 88 are first mounted onto hubs 112 of discs 106 as described above. The shaft portions 92 of couplings 88 are then connected to motor 74 and bearing 136, respectively. Shaft 120 is then installed, such that ends 122 and 124 are connected to the shaft connectors 114 located on support discs 106. Accordingly, when motor 74 is operated, output shaft 84 rotates the connected disc 106 which, in turn rotates the power transfer shaft 120 which then causes rotation of the opposing disc 106 as permitted by bearing 136. The spit assembly 82 may be disassembled by reversing the assembly process, for instance when it is desired to clean the cooking chamber 58.

Figure 8:
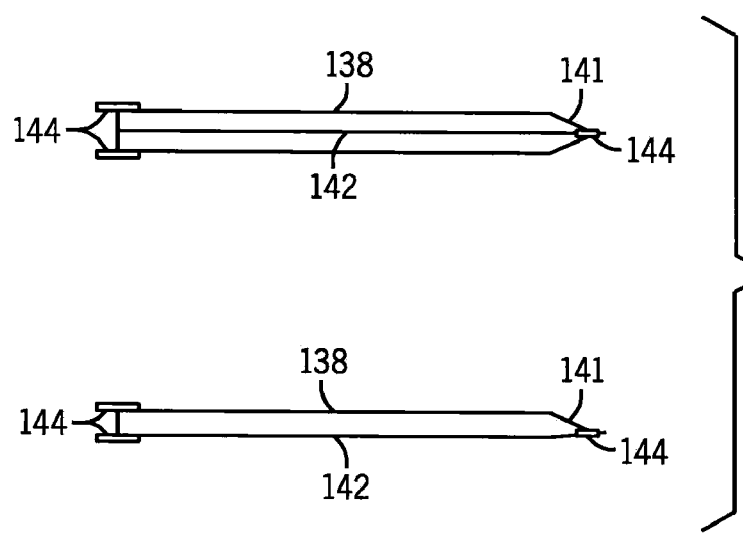
FIG. 8 presents a pair of side elevation views of an angled spit that form a part of the preferred embodiment of the invention.

Referring now also to FIG. 8, the assembled spit assembly 82 is illustrated having various spits 78 connected between the rotating discs 106. In particular, a first angled spit 138 includes a pair of elongated axially extending flat walls 140 that join at an axially extending apex 142 to assume the general shape of an elongated bracket. Walls 140 define a pointed end 141 that is disposed at one end of spit 138. A mounting pin 144 extends outwardly from the pointed end 142. The other end of the spit 138 includes a pair of mounting pins 144 extending outwardly (one from each wall 140).

Referring to FIG. 9 in particular, a second dual-prong spit 145 includes a pair of cylindrical skewer rods 146 that are joined by a rib 150 at one end. Mounting pins 144 (not shown) extend outwardly from each end of each rod 146. The mounting pins disposed remote from rib 150 may be pointed to assist in piercing uncooked food product. The mounting pins of spit 146 are spaced the same distance apart as mounting pins 144 of spit 138.

Referring now to FIG. 10, a third spit is a basket 149 that includes an axially elongated base 150 integrally connected to opposing side walls 152 that are angled outwardly with respect to the base. A pair of opposing end walls 154 closes each basket 149. Food product (for instance, of the type that is not suitable to be easily skewered) can thus sit in baskets 149 during operation. A slot or plurality of slots (not shown) extends between the base 150 and side walls 152 to assist in the drainage of grease that is produced during the preparation of the food product. A mounting flange 156 extends upward from each end wall 154, and supports a mounting pin 144 that extends outwardly from the flange 156. Mounting pins 144 enable rotation of the corresponding spit 78. It should be appreciated that any of spits 78, 138, and 149 can be interchangeably attached to support discs 106 as desired to accommodate a given food product to be cooked. In this regard, it should be appreciated that "spit" as used herein refers to any apparatus configured to correct between discs 106 that is suitable to carry food product during a food preparation sequence.

Discs 106 define a plurality of spit mounting locations 158 circumferentially spaced about outer ring portion 108. Each mounting location 158 includes two pairs of apertures 160 designed to receive mounting pins 144. In particular, a first pair of apertures 160 includes first and second radially aligned apertures, respectively, while a second pair of apertures 160 includes tangentially aligned apertures.

The tangentially aligned apertures 160 are configured to receive mounting pins 144 of the dual-pronged ends of spits 138 and 146. Radially aligned apertures 160 are configured to receive mounting pins 144 of the single-pronged ends of spits 138 and 149. Advantageously, for larger food product, spit 138 may be orientated with the single mounting pin 144 of the pointed end 142 in the radially inner aperture 160 such that apex 144 points inwardly to position the food product away from the radiating heat elements, as will be described below. Alternatively, for smaller food product, mounting pin 144 of the pointed end 142 may be positioned in the radially inner aperture 162 such spit 138 is inverted and apex 142 faces outwardly, thereby positioning the food product closer to the radiating heat elements. Sufficient clearance exists such that one end of the spits 78 may be translated towards one of the discs 106 such that the mounting pin(s) 144 at the opposite end are removed from the corresponding disc 106. Accordingly, spits may be easily attached to and removed from assembly 82.

Figure 11:
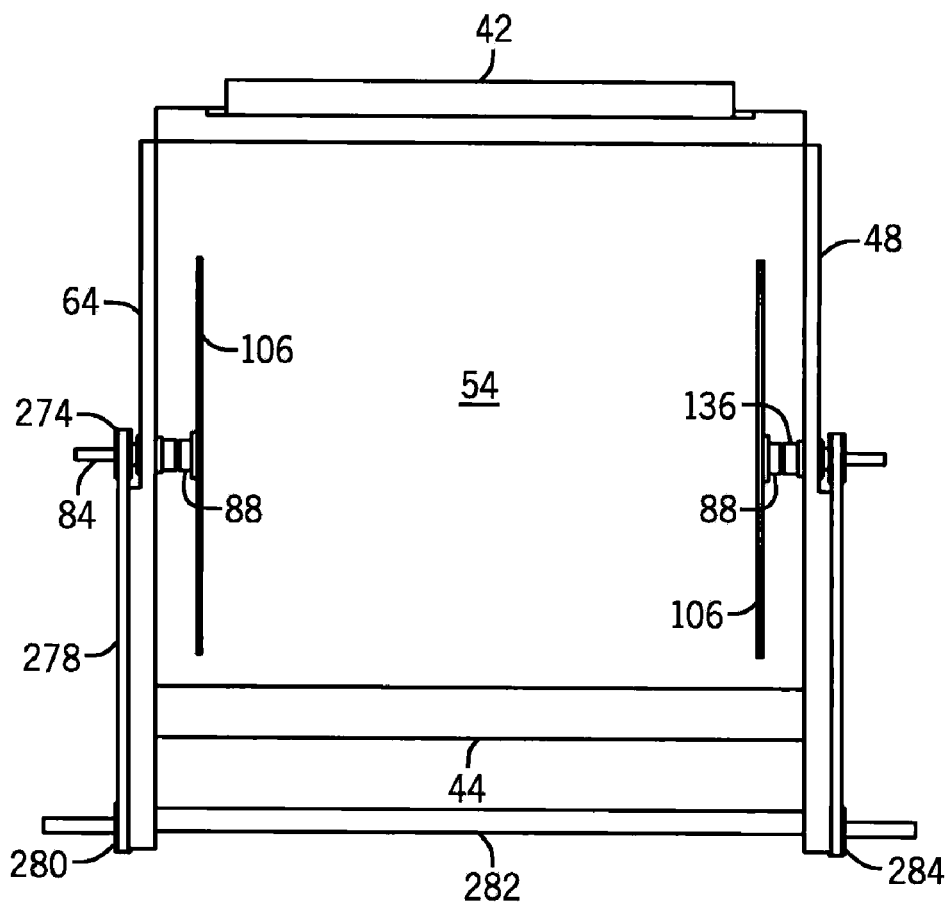
FIG. 11 is an end elevation view of a drive assembly portion of the spit assembly constructed in accordance with an alternate embodiment of the invention.

Referring to FIG. 11, the drive portion of a spit assembly 270 is illustrated in accordance with an alternate embodiment. Spit assembly 270 includes all components described above with respect to spit assembly 82 (unless otherwise mentioned), except assembly 270 does not require power transfer shaft 120 to extend through cooking chamber 54. As a result, additional space is preserved for food product that is to be prepared.

Instead, while discs 106 are coupled to output shaft 84 and bearing 136, respectively, in the manner described above, output shaft 84 includes a pulley 274 disposed outside of chamber 58. Pulley 274 supports a drive belt 278 that extends down to a pulley 280 mounted to the left end of a power transfer shaft 282 extending beneath lower wall 44. Pulleys 274 and 280 are vertically aligned. A second set of pulleys includes a pulley 284 connected to the right end of shaft 282 that is in vertical alignment with a pulley 285 extending through housing wall 48 and rotatably coupled to bearing 136 and, hence, the corresponding support disc 106. A driven belt 286 is connected between pulleys 284 and 285 such that rotation of shaft 282 causes disc 106 carried by the right side wall to rotate. Accordingly, both discs 106 (and remaining portions of spit assembly 270) are caused to rotate upon rotation of motor output shaft 84 without the need for a shaft to span between the discs 106 inside the cooking chamber 58.

The various systems of oven 40 will now be described with initial reference to FIGS. 13-15. In particular, a rectangular recess 173 is formed in side wall 64 that carries a convection heating system 172 and steam-producing cleaning system 174. In particular, heating system 172 includes a standard resistive coil 180 in the form of a loop that is connected to controller 77 and produces heat in response to an electrical current input. A fan 182 is disposed inside the loop formed by the coil 180, and includes a circular plate 183 supporting a plurality of circumferential fan blades 184 that rotate about a hub 186 to draw air into heating system 172 from cooking chamber 58.

Figure 15:
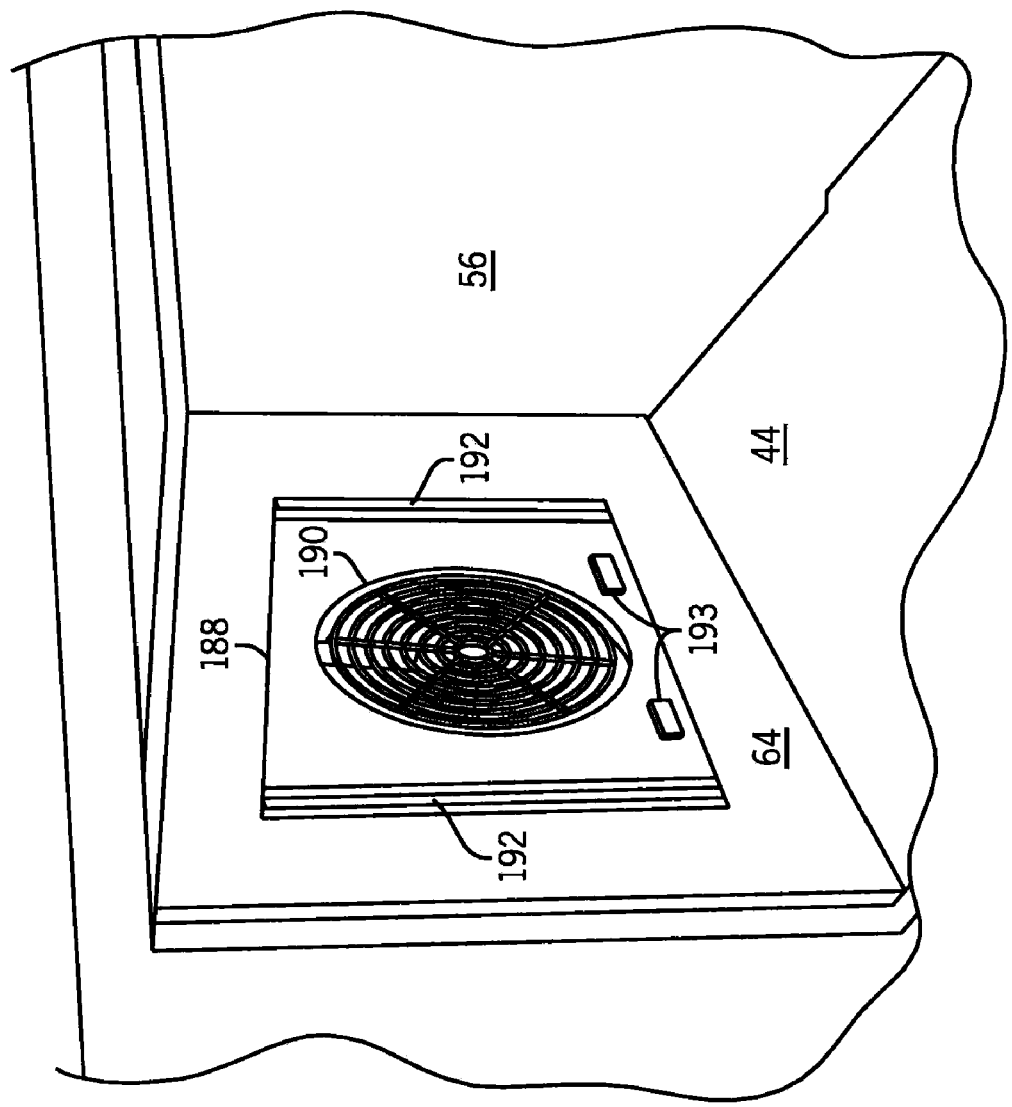
FIG. 15 is a perspective view of the convection heating system illustrated in FIG. 13, but with the cover plate closed.

A cover 188 is hingedly mounted on the left side wall 64 and can be closed to the position illustrated in FIG. 15 to house convection heating system 172. A plurality of grooves 190 extend through the cover 188 and are substantially aligned with fan 182 to provide an air intake for the fan 182. Cover 188 does not span laterally the entire distance of recess 173 such that vertically extending gaps 192 are defined between cover 188 and left side wall 64 on both lateral sides of fan 182 to provide an air outlet for heated air. Horizontal vents 193 are also formed in cover 188 to provide additional air outlets. Accordingly, during operation, fan blades 184 rotate to draw air into the fan 182 via intake grooves 190. The air is expelled radially outwardly by the fan blades 184, thereby forcing the air to flow across resistive coil 180 before being expelled into the cooking chamber 58 via air outlet gaps 192 and 193 to heat the food product.

Figure 13:
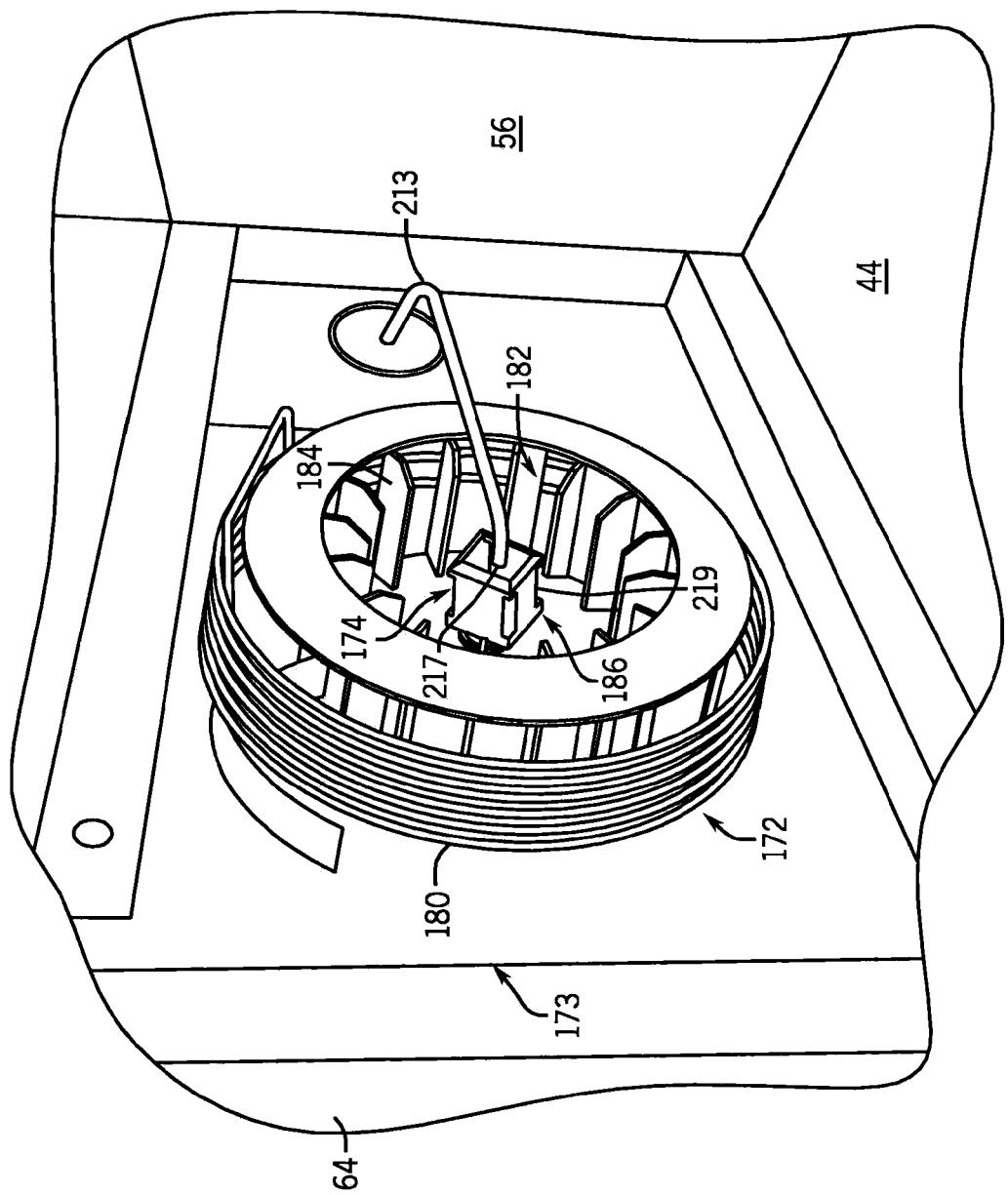
FIG. 13 is a perspective view of the left side wall of the cooking chamber having a convection heating system in combination with a steam cleaning system.
Figure 14:
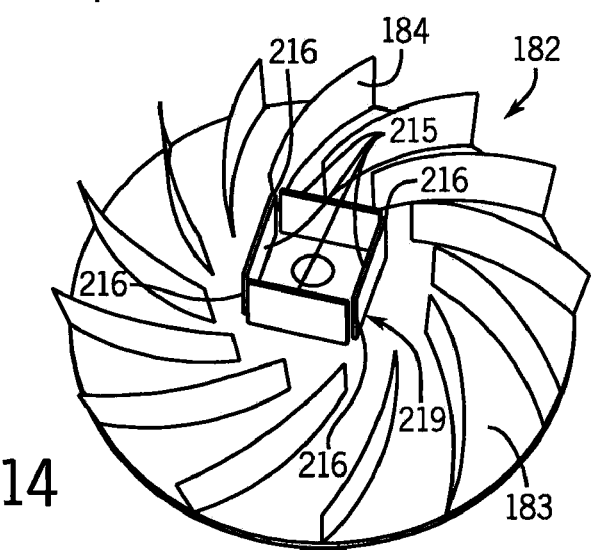
FIG. 14 is a perspective view of a fan blade member used in combination with the convection heating system illustrated in FIGS. 13.

With continuing reference to FIGS. 13-15, the present invention recognizes the difficulties associated in removing grease produced during a cooking sequence from the walls of the cooking chamber 58. Accordingly, a steam producing assembly 174 is provided that introduces steam into the cooking chamber 58 once a user initiates a cleaning cycle via user controls 77. In order to ensure that steam is not introduced into chamber 58 during the cooking cycle, oven 40 will prevent steam from being produced until the temperature in the cooking chamber 58 is below a predetermined threshold indicating the food product is no longer being cooked.

Steam assembly 174 includes a conduit 213 carrying water from a conventional water source (not shown). Conduit extends through left side wall 64, and preferably through recessed region 173. Conduit 213 defines a distal outlet end 217 that disposed at hub 186 of fan 182. In particular, outlet end 217 is disposed within a water distributor 219 that surrounds hub 186. Distributor 219 includes a plurality of side walls 215 that define an open outer end 214 that receives water from conduit 213. A slot 216 extends through the interface between adjacent side walls 215. Accordingly, water entering the distributor 219 via conduit 213 is "slung" through slots 216 as fan 182 rotates. The expelled water then contacts the heating coil 180 to produce steam that is emitted into the cooking chamber 58 via gaps 192 and 193 under forces from fan blades 184. It has been found that the introduction of steam into a chamber increases the efficiency of grease removal. During operation, cover 188 can be closed over conduit 213 as illustrated in FIG. 15.

Figure 16:
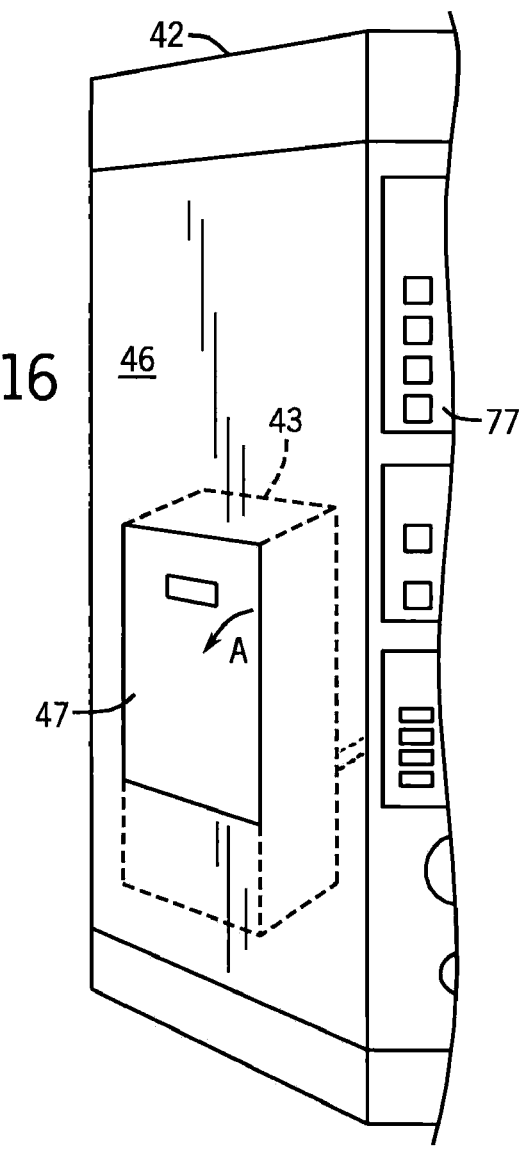
FIG. 16 is a perspective view of the left side of the oven housing including a reservoir constructed in accordance with an alternate embodiment.

As discussed above, conduit 213 can receive water from a waterline (e.g., faucet). Alternatively, referring now to FIG. 16, conduit 213 can receive water from an internal tank 43 that is either located external to the oven 40, or mounted within cabinet 68. Tank 43 can be filled as needed when chamber 58 is to be steam cleaned. In particular, a hatch 47 is formed in left side wall 46 of housing 41 that may be opened in the direction of Arrow A. Water may be delivered into the hatch 47 to fill internal tank 43 that is connected to outlet 213. In this embodiment, water can be forced through conduit 213 via a pump (not shown) or, alternatively, conduit 43 can be connected to tank 43 in a desired manner to produce water pressure from the water stored in tank, thereby forcing water through conduit and into distributor 219.

Figure 12:
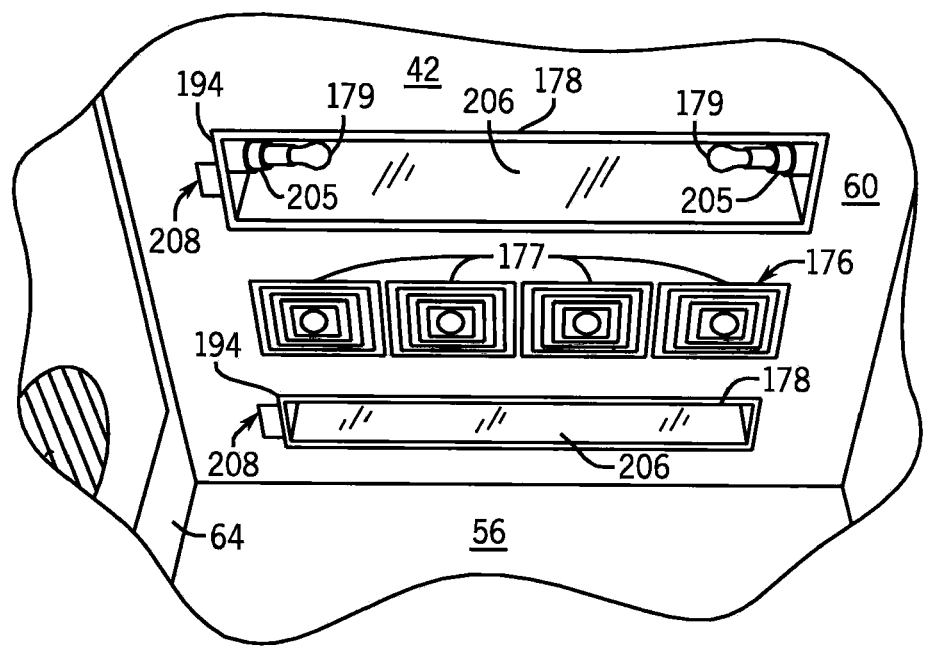
FIG. 12 is a perspective view of the upper wall of the cooking chamber including a lighting system and radiating heating system.

Referring now to FIG. 12, oven 40 further includes a radiating heat system 176 that deliver radiating heat to food product carried by spit assembly 82. Radiating heat system 176 is elongated in a direction between side walls 48 and 64 and is centrally disposed above spit assembly 82. The cooking chamber 58 thus advantageously incorporates a convection heat source 172 that is used to cook raw food product along with a radiation heat system 176 that browns the food being prepared.

Radiation heat system 176 includes a plurality of rectangular ceramic discs 177 having grooves that at least partially enclose traditional resistive coils. In particular, the bottom of the coil (when positioned as installed in the cooking chamber 58) is essentially coated with a ceramic material which has been found to emit infrared heat that is less scattered compared to coils that are not embedded in ceramic. The food product is thus browned more uniformly than conventionally achieved. The coils are connected via electrical leads to the control, and emit heat upon an electrical current input. As described above, angled spit 138 may be positioned in the discs 106 in a desired orientation depending on the desired distance between heat system 176 and the outer surface of the food product.

Accordingly, heat is produced in response to the supply of electrical power to the coils, which is controlled via user inputs 77, in order to prepare food product rotating with spit assembly 82. Ceramic heaters 177 are preferably of the type commercially available from OGDEN Corp, located in Arlington Heights, Ill. or Chromalox, Inc. located in Pittsburgh, Pa.

The present invention recognizes that the heating systems 172 and 176 are rated commercially for a predetermined wattage output, as it is desirable to ensure the consistency of the food preparation process. Because the oven 40 may be used worldwide in electrical receptacles that deliver electrical currents having varying input voltage levels, the control 77 senses the input voltage and delivers electrical pulses to the heating systems 172 and 176 to regulate the effective voltage that is applied to the heating systems. Increased input voltage levels will cause the controller to reduce the pulse frequency, and vice versa. Accordingly, a consistent desired wattage output of the heating systems is advantageously maintained. The pulses may either be delivered independently to each heating system 172 or 176. Alternatively, a combined pulse may be sent to both heating systems 172 and 176. Furthermore, controller 77 is connected to motor 74 of spit assembly 82 via a DC motor that pulses power to motor 74 in response to a user input on the user controls 77, thus enabling the user to regulate the speed of spit rotation.

A pair of lighting systems 178 are both disposed in the upper wall 42 of cooking chamber 58 to illuminate cooking chamber 58 on demand. Lighting systems are positioned such that radiating heat system 176 is centrally disposed between the pair of lighting systems 178. Lighting systems 178 extend between side walls 64 and 48 and parallel to radiating heat system 176. Each lighting system 178 is disposed in a rectangular recess 194 that is formed in the upper wall 60 of cooking chamber 58. A pair of opposing sockets 205 extends into the recess 194. Advantageously, sockets 205 receive standard Edison Socket style of light bulbs 179 as well as more expensive Halogen bulbs. The recess 194 is closed at its bottom via a glass cover 206 that is hingedly connected to the lower edge on of the recess walls, and fastened to an opposing side wall via a latch 208. Accordingly, the glass cover 206 may be opened and closed as desired when bulbs 179 are to be replaced. Lighting systems 178 can be activated upon opening either door 54 or 56, or alternatively can be controlled via user inputs 77.

Advantageously, the bulbs 179 are disposed above the radiation heat source 176, and are thus not exposed to direct infrared heating. Furthermore, the recess 194 and glass cover 206 shield the bulbs 179 from the convection heat source 172. Accordingly, the bulbs 179 are not as susceptible to breakage as conventional designs whose bulbs are placed in the cooking chamber in the direct path of heat from the heat source. Furthermore, when bulbs of conventional ovens break during a food preparation sequence, the bulb particles become scattered on the food, which must therefore be discarded. In accordance with the preferred embodiment, if bulbs 179 were to somehow break, cover 206 would prevent the remnants from entering the cooking chamber 58, thereby preserving the food being prepared.

Figure 17:
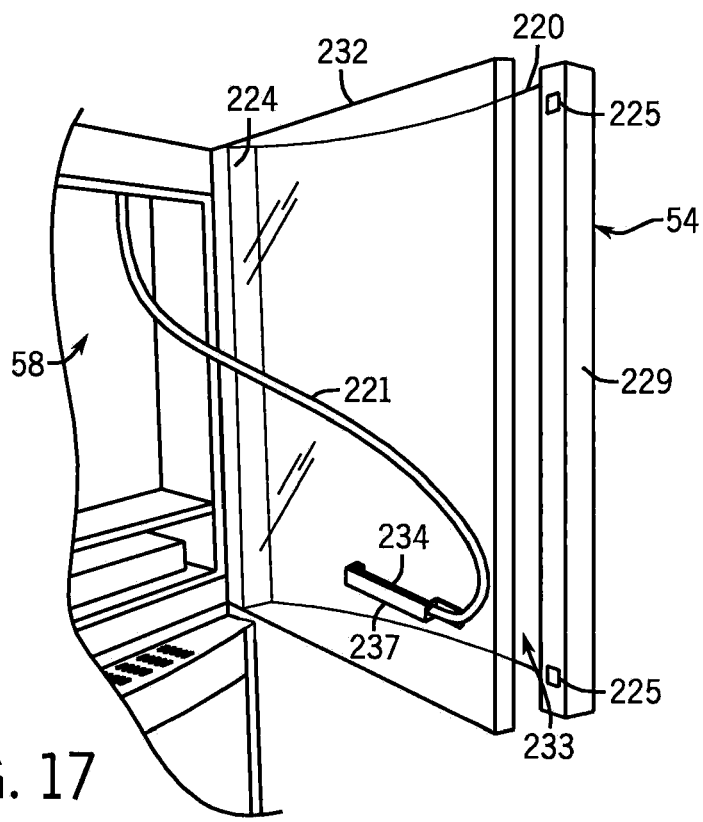
FIG. 17 is a perspective view of a front door assembly of the oven.

Referring now to FIG. 17, front door assembly 54 includes an outer glass pane 220 that is bowed along a vertical axis away from cooking chamber 58. A door handle 222 (See FIG. 1) is connected to one end of the outer surface of glass member 220. Pane 220 is hingedly connected to oven via a vertical door frame member 224, and is further supported at its end opposite the hinged end via a second vertical door frame member 229. A second, flat, glass pane 232 is provided that is hingedly connected to door frame member 224, and is inwardly disposed with respect to pane 220. A gap 233 extends between panes 220 and 232 for heat dissipation during use. Glass panes 220 and 232 are permitted to rotate relative to chamber 48 and to each other, however panes 220 and 232 are generally coupled for rotation together, and are primarily decoupled when cleaning becomes necessary.

A plurality of magnets 225 is disposed in door frame 229. The magnets 225 are sensed at the housing 41 and communicated to the oven controller to automatically determine when the door 54 assembly is open. The magnets 225 further bond the door assembly 54 to the housing 41. A strip of silicon rubber or like sealant (not shown) can be applied to the front wall 50 of housing 41 around the opening to cooking chamber 58 in order to form a tight seal with the door assembly 54 to prevent leakage of flavored gasses from the cooking chamber 58.

As described above, insulated electrical wiring 221 is mounted at upper surface 42 within cooking chamber 58, and extends down towards door assembly. A temperature probe 234 is connected to the distal end of wiring 221 and is supported by a bracket 237 mounted onto the inner surface of pane 232. Accordingly, when door assembly 54 is opened, a user can insert probe 234 into the food product being cooked to measure the temperature of the food product, which can be displayed at user output 77. In accordance with the preferred embodiment, the oven controller is programmed to automatically measure and display the temperature of the sensor 79 to display the temperature inside cooking chamber 58 until the door assembly 54 is opened, at which point the control will display the temperature of probe 234. Of course, the user may change these default settings if desired.

As noted above, rear door assembly 56 can be constructed in the manner described with reference to front door assembly 54.

Figure 18:
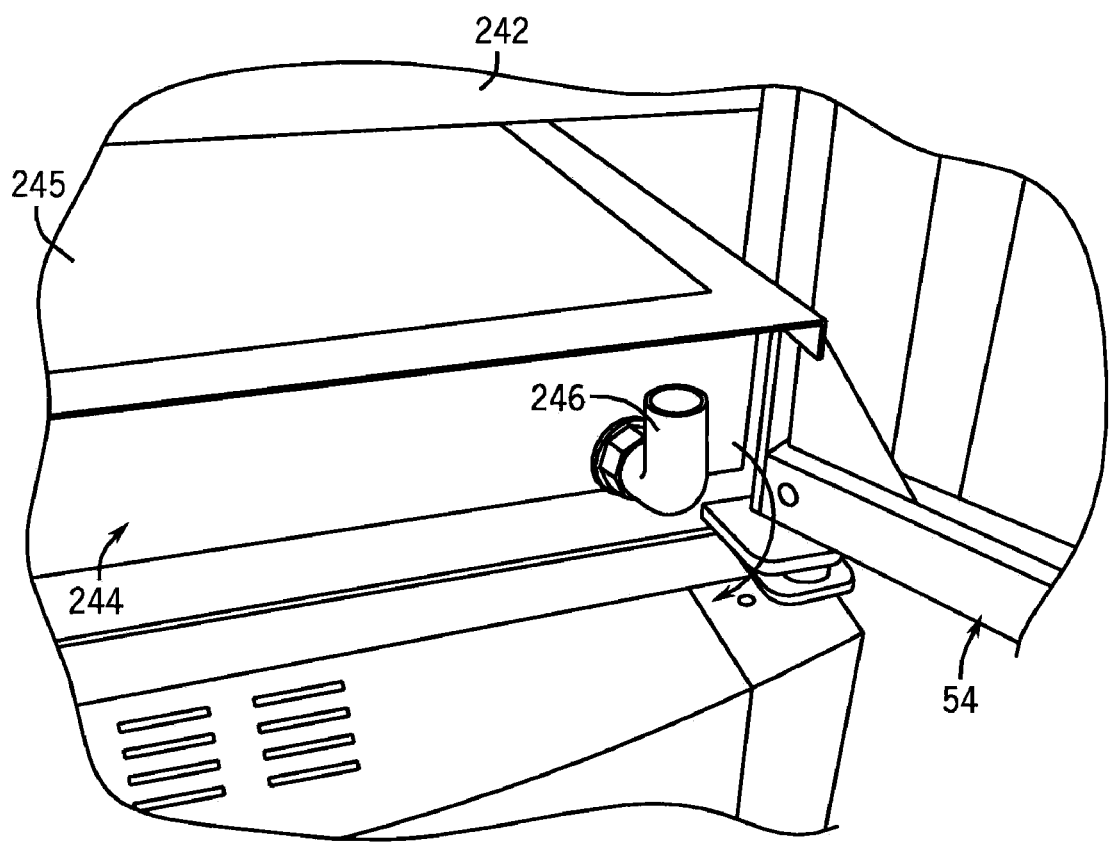
FIG. 18 is a perspective view of a waste pan having a drainage valve constructed in accordance with a preferred embodiment of the invention, wherein the valve is in a closed position.

Referring now to FIG. 18, a drain pan 242 is be disposed above the base 62 of cooking chamber 58, and is angled downward along a direction into chamber 48 from both door assemblies 54 and 56. A groove (not shown) can extend axially at the apex of the drain pan 242 that enables grease to drain from the drain pan 242. A waste pan 244 is disposed between base 62 and the drain pan 242, and provides a receptacle 245 that receives grease and other cooking byproducts from the groove in drain pan 242. Waste pan 244 may be easily removed from and inserted into the void between base 62 and drain pan 242. Alternatively, waste pan 244 could include a trough at its base that in connected to a conduit which, in turn, connects to a proper grease disposal site.

A valve 246 is disposed in the front surface 248 of the waste pan 244 at a location towards the base. The valve 246 provides a conduit that extends outwardly from the waste pan 244 and upwardly when it is desired to store the contents in the waste pan. Once it is desired to drain the waste pan, the valve 246 is rotated downwardly in the direction of Arrow B, thereby enabling fluid to flow through the valve 246 and into a conduit or a portable receptacle (not shown) for the removal of grease. The base of waste pan 244 may be angled downward towards valve 246 to force fluid to flow into the valve. Alternatively, oven 40 may include a grease removal system of the type described in U.S. Provisional Patent Application Ser. No. 60/464,681, and further files as a U.S. utility patent application Apr. 22, 2004 entitled "Grease Collection System for Oven", the disclosure of which is hereby incorporated by references.

Figure 19:
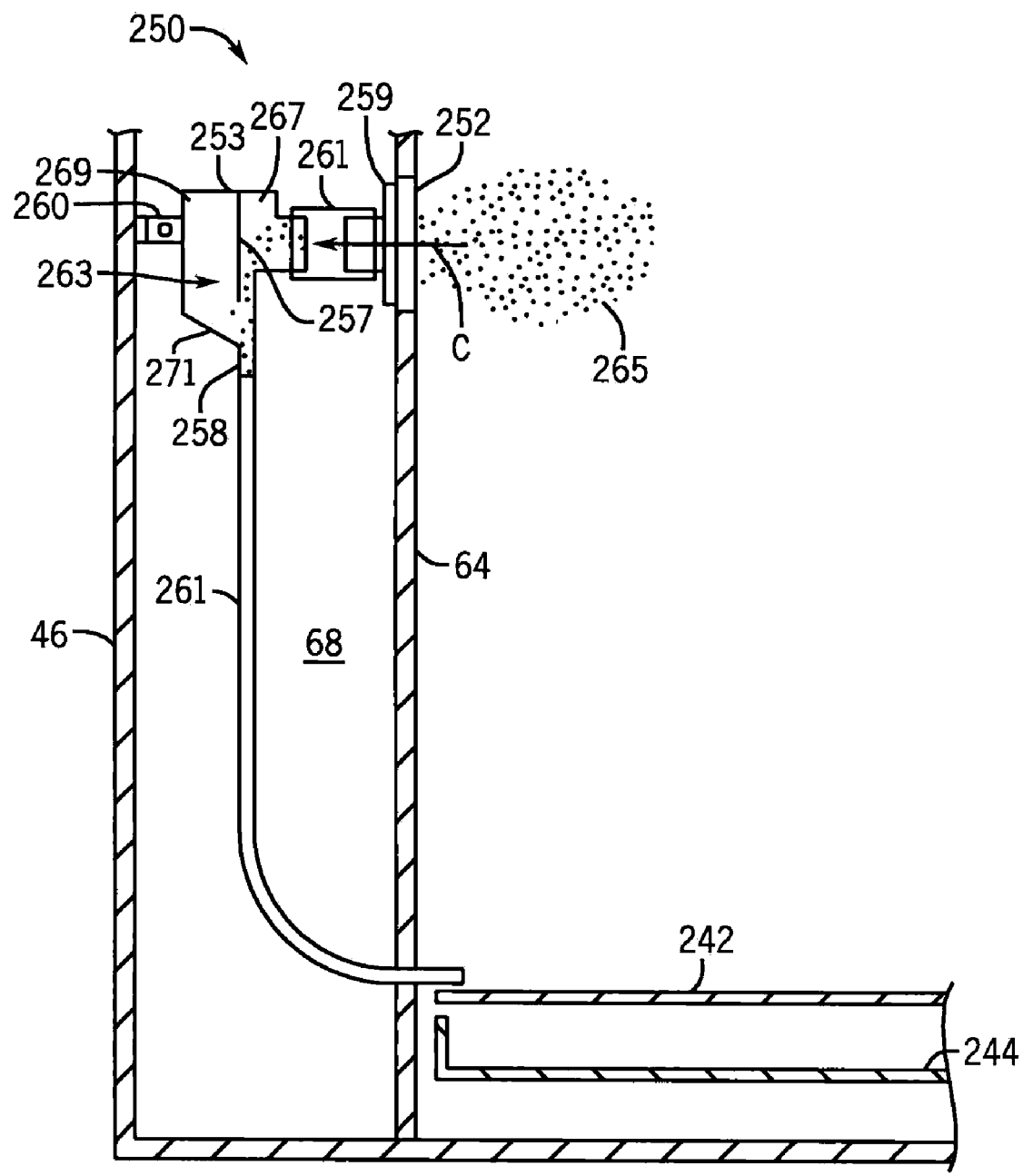
FIG. 19 is a schematic sectional side elevation view of a mechanical humidity control module constructed in accordance with an alternate embodiment of the invention.

Referring now to FIG. 19, oven 40 may include a humidity regulating system 250 that reduces the humidity level inside cooking chamber 58 in order to reduce the accumulation of condensation on door assemblies 54 and 56. Humidity regulating system includes a vapor intake channel 252 extending through the upper end of left side wall 64 of cooking chamber 58. Intake channel 252 is connected to an adapter 259 disposed in cabinet 68 which, in turn, delivers incoming humid air 265 produced during cooking along the direction of Arrow C to a conduit 261 that flows into a condensing box 253. Condensing box 253 defines an internal reservoir 263 that receives air from conduit 261.

A baffle plate 257 extends down from the upper wall of condensing box 253, and separates reservoir 263 into an intake section 267 and a vacuum section 269. Baffle plate 257 does not extend entirely through to the bottom wall 271 of condensing box 253. Accordingly, vacuum section 269 is in fluid communication with intake section 267. Reservoir 263 defines a drain 255 extending through bottom wall 271, which is sloped towards drain 255 to directed condensed liquid into drain 255. Drain 255 is connected an outlet tube 258 that extends through side wall 64 and delivers fluid to drain pan 242 or, alternatively, directly into waste pan 244.

During operation, incoming air 265 flows into intake channel 252 and eventually into condensing box 253. The temperature of condensing box may be regulated using any conventional refrigeration or cooling system in order to ensure that the incoming steam condenses into a liquid inside condensing box 253. A blower 260 may be mounted to vacuum section 269 in order to draw air from the cooking chamber 58 into vacuum section 267. Advantageously, baffle plate 257 prevents the incoming air 265 from flowing directly into blower 260 prior to moisture removal. Instead, the moisture in the incoming air 265 condenses as the air travels down through intake section 267 before traveling up through vacuum section 269. Air 265 can also condense while traveling up in the vacuum section 269 prior to being expelled from the oven by blower 260. The condensed fluid flows down into drain 258, through conduit 258, and ultimately into drain pan 242 or waste pan. The oven control can also sense the humidity level inside cooking chamber 58 and adjust the speed of blower 60 accordingly in order to maintain a desired humidity level. The reduced humidity level reduces condensation from accumulating on doors 54 and 56, and hence provides the user with improved visible access to the food product being prepared.

In accordance with an alternative embodiment, blower 260 can be eliminated, and inlet 252 can be sized sufficiently large to ensure that steam produced during cooking will naturally flow into condensing box 253. Furthermore, inlet 252 may be sloped upwards so as to enable a greater amount of steam (which flows upwards in chamber 58) to enter the humidity control module 250.

The above description has been that of the preferred embodiment of the present invention, and it will occur to those having ordinary skill in the art that many modifications may be made without departing from the spirit and scope of the invention. In order to apprise the public of the various embodiments that may fall in the scope of the present invention, the following claims are made.

We claim:

1. A rotisserie oven for preparing cooked food product from a raw food product, the oven comprising:
   a cooking chamber defined by side walls joined at their outer ends to upper and lower walls, the chamber defining at least one open end closed by a movable door assembly, wherein the door assembly comprises an inner glass pane rotatably coupled to an outer glass pane that is bowed outwardly with respect to the inner glass pane to define a gap therebetween;
   a radiating heating system disposed in the cooking chamber that receives an electrical current and produces radiating heat;
   a convection heat system disposed in the cooking chamber, including:
      i. one or more heating elements that produce heat in response to an electrical current;
      ii. a rotating fan that draws incoming air from the cooking chamber into the convection heat system, forces the air over the heating elements to become heated, and expels the heated air into the cooking chamber; and
   a spit assembly including a pair of rotating discs rotatably attached proximal the side walls and carrying at least one spit configured to support a food product that is heated by the radiating heat source and the convection heat source.

2. The rotisserie oven as recited in claim 1, further comprising a food temperature probe mounted onto an inner surface of the inner glass pane, wherein the probe can be inserted into the food product to measure the temperature thereof.

3. The rotisserie oven as recited in claim 2, wherein the probe temperature is automatically displayed when the door assembly is opened.

4. The rotisserie oven as recited in claim 3, further comprising a chamber temperature sensor mounted inside the chamber for measuring the chamber temperature that is automatically displayed when the door assembly is closed.

5. The rotisserie oven as recited in claim 1, further comprising a front and a rear door assembly.

6. The rotisserie oven as recited in claim 1, wherein the radiating heat source comprises at least one resistive coil in communication with a ceramic member that becomes heated by the coil.

7. The rotisserie oven as recited in claim 1, the spit assembly comprising:
   a motor having a rotating output shaft extending from one of the cooking chamber side walls;
   a first disc coupled to the output shaft and rotatably fixed thereto;
   a power transfer shaft coupled at a first end to the first disc and rotatably fixed thereto;
   a second disc coupled to a second end of the power transfer shaft opposite the first end and rotatably fixed thereto, the second disc being further rotatably coupled to the other cooking chamber side wall.

8. The rotisserie oven as recited in claim 7, the second disc including a connector having an engagement surface that is coupled to an engagement surface of at least one end of the power transfer shaft to form a joint.

9. The rotisserie oven as recited in claim 1, further comprising a steam cleaning system including A) a distributor member defining an opening having a plurality of radial outlets, and B) a water supply source extending into the opening of the distributor; wherein water is directed to the rotating fan blades and across the heating elements to produce steam that is expelled into the cooking chamber.

10. The rotisserie oven as recited in claim 9, wherein operation of the steam cleaning system begins only when the temperature in the oven is below a predetermined threshold indicating that food product is not being cooked.

11. The rotisserie oven as recited in claim 1, wherein the spit assembly carries an angled spit having first and second angular walls that join at an apex, the spit including members that attach the spit to the discs in one of two possible positions that adjust the distance between the apex and the radiating heat source.

12. The rotisserie oven as recited in claim 9, wherein fan rotation forces the fluid through the radial outlets.

13. The rotisserie oven as recited in claim 1, further comprising;
   a server-side access assembly including a single second door disposed at a server-side location remote from the chef-side location, the second door providing access to the chamber for the removal of the prepared food product therefrom; and
   a set of controls;
   wherein the movable door assembly is disposed at a chef-side location of the oven and provides access to the chamber for inserting the raw food product therein;
   wherein the set of controls is disposed proximal the chef-side location to control the cooking elements.

14. The rotisserie oven as recited in claim 13, further comprising an indicator that is activated when the raw food product has been prepared.

15. The rotisserie oven as recited in claim 14, wherein the indicator is positioned on one of the chef-side and the server-side.

16. The rotisserie oven as recited in claim 14, wherein the indicator is one of a light and an audible alarm.

17. A rotisserie oven for preparing cooked food product from a raw food product, the oven comprising:
   a cooking chamber defined by side walls joined at their outer ends to upper and lower walls, the chamber defining at least one open end closed by a movable door assembly;
   a radiating heating system disposed in the cooking chamber that receives an electrical current and produces radiating heat;
   a convection heat system disposed in the cooking chamber, including:
      i. one or more heating elements that produce heat in response to an electrical current;
      ii. a rotating fan that draws incoming air from the cooking chamber into the convection heat system, forces the air over the heating elements to become heated, and expels the heated air into the cooking chamber; and a spit assembly including a pair of rotating discs rotatably attached proximal the side walls and carrying at least one spit configured to support a food product that is heated by the radiating heat source and the convection heat source: the spit assembly comprising:
  a motor having a rotating output shaft extending from one of the cooking chamber side walls;
  a first disc coupled to the output shaft and rotatably fixed thereto;
  a power transfer shaft coupled at a first end to the first disc and rotatably fixed thereto;
  a second disc coupled to a second end of the power transfer shaft opposite the first end and rotatably fixed thereto, the second disc being further rotatably coupled to the other cooking chamber side wall;
  the second disc including a connector having an engagement surface that is coupled to an engagement surface of at least one end of the power transfer shaft to form a joint;
  wherein the at least one end carries a movable collar that covers the joint, and wherein the at least one end defines a recess disposed inwardly of the joint that carries a washer to prevent the collar from sliding out of engagement with the joint.

18. A rotisserie oven for preparing cooked food product from a raw food product, the oven comprising:
  a cooking chamber defined by side walls joined at their outer ends to upper and lower walls, the chamber defining at least one open end closed by a movable door assembly;
  a radiating heating system disposed in the cooking chamber that receives an electrical current and produces radiating heat;
  a convection heat system disposed in the cooking chamber, including:
    i. one or more heating elements that produce heat in response to an electrical current;
    ii. a rotating fan that draws incoming air from the cooking chamber into the convection heat system, forces the air over the heating elements to become heated, and expels the heated air into the cooking chamber; and
  a spit assembly including a pair of rotating discs rotatably attached proximal the side walls and carrying at least one spit configured to support a food product that is heated by the radiating heat source and the convection heat source, the spit assembly comprising:
    a motor having a rotating output shaft extending therefrom;
    a first disc coupled to the output shaft and rotatably fixed thereto inside the cooking chamber at one of the side walls;
    a drive belt extending from the output shaft to a first end of a power transfer shaft located below the cooking chamber;
    a driven belt extending from a second end of the power transfer shaft to a location in communication with a second disc supported by the opposite side wall coupled to the other cooking chamber side wall.

19. A rotisserie oven for preparing cooked food product from a raw food product, the oven comprising:
  a cooking chamber defined by side walls joined at their outer ends to upper and lower walls, the chamber defining at least one open end closed by a movable door assembly;
  a radiating heating system disposed in the cooking chamber that receives an electrical current and produces radiating heat;
  a convection heat system disposed in the cooking chamber, including:
    i. one or more heating elements that produce heat in response to an electrical current;
    ii. a rotating fan that draws incoming air from the cooking chamber into the convection heat system, forces the air over the heating elements to become heated, and expels the heated air into the cooking chamber; and
  a spit assembly including a pair of rotating discs rotatably attached proximal the side walls and carrying at least one spit configured to support a food product that is heated by the radiating heat source and the convection heat source;
  further comprising a humidity control system including a condensing housing defining an interior that receives moist air from the cooking chamber, the interior having a temperature regulated to condense the moist air and produce a liquid.

20. The rotisserie oven as recited in claim 19, wherein the humidity control system further comprises a baffle plate bifurcating the interior into an intake section and a vacuum section, and a pump supplying a negative air pressure at the vacuum section to draw air into the housing from the cooking chamber at the intake section.

21. The rotisserie oven as recited in claim 20, further comprising an outlet from the housing at a location below the baffle plate.

* * * * *

UNITED STATES PATENT AND TRADEMARK OFFICE
CERTIFICATE OF CORRECTION

| | | |
|---|---|---|
| PATENT NO. | : 7,487,716 B2 | Page 1 of 1 |
| APPLICATION NO. | : 10/911304 | |
| DATED | : February 10, 2009 | |
| INVENTOR(S) | : Phillip D. Swank et al. | |

It is certified that error appears in the above-identified patent and that said Letters Patent is hereby corrected as shown below:

Col. 6, Line 13
"correct" should read
--connect--

Signed and Sealed this

Twenty-sixth Day of May, 2009

JOHN DOLL
*Acting Director of the United States Patent and Trademark Office*